United States Patent Office 3,170,893
Patented Feb. 23, 1965

3,170,893
STABILIZATION OF POLYETHYLENE FOR THERMAL PROCESSING WITH SULFIDES OF DIALKYL PHENOLS
Samuel Steingiser, Bridgeville, Pa., and Ival O. Salyer, Dayton, Ohio, assignors to Monsanto Company, St. Louis, Mo., a corporation of Delaware
No Drawing. Continuation of application Ser. No. 388,689, Oct. 27, 1953. This application June 25, 1964, Ser. No. 378,068
20 Claims. (Cl. 260—45.95)

This invention relates to polymers of ethylene. In preferred aspects the invention pertains to the stabilization of polyethylene against oxidative cross-linking during thermal processing. In other aspects the invention pertains to a particular class of compounds effective in very low concentrations to give stability to polyethylene during thermal processing.

This application is a continuation of our copending application Serial No. 388,689 filed October 27, 1953, now abandoned.

The term "polyethylene" as employed herein refers to the normally solid high molecular weight polymers of ethylene. Such polymers usually have a molecular weight of at least 6,000 and preferably for the practice of this invention have a molecular weight of 20,000 to 30,000 or above. They have a waxy feel. When examined by the X-ray diffraction technique these polyethylenes exhibit the presence of a crystalline phase. Polyethylene suitable for the practice of the present invention can readily be made by subjecting monomeric material consisting of or comprising ethylene, containing, say, 50 to 200 parts per million oxygen, to polymerization at very high pressures, for example, 15,000 to 40,000 pounds per square inch. Various other methods of preparing solid polyethylene, for instance, by employing peroxide or azo catalysts and water or organic liquid reaction media along with moderately high pressures, for example, 5,000 to 10,000 pounds per square inch, are well-known in the art. The invention is applicable to homopolymers of ethylene, and normally solid polyethylene-type materials which are copolymers of ethylene and one or more ethylenically unsaturated comonomers employed in an amount usually not to exceed 15 weight percent of the ethylene, for instance, styrene, vinyl chloride, vinyl acetate, vinylidene chlorofluoride, methyl methacrylate.

Polyethylene is subject to degradation by heat and light. When polyethylene is mechanically worked in the presence of air at the elevated temperatures necessary for processing and fabrication, oxidative cross-linking occurs wherein the polymer becomes lower in flow, higher in elastic memory, and lower in tensile elongation. In addition, the originally excellent high and low frequency electrical resistivity of the polymer becomes progressively poorer. Furthermore, cross-linking occurs upon prolonged exposure of the polymer to ultraviolet radiation in the presence of air. Stabilization against thermal degradation is of prime importance. In all applications the polymer must be able to withstand the thermal processing required in fabrication; whereas stabilization against photodegradation although desirable is not usually essential. Materials which have been suggested or used for thermal stabilization of polyethylene in the past are unsatisfactory for one or more of the following reasons: They impart a dark color to the product; and this is obviously undesirable where it is necessary to produce a wide variety of light pastel colors. Established stabilizers are so inefficient as to require relatively high concentrations which impair electrcal and physical properties and are also uneconomical. Many of the stabilizers are toxic and cannot be used in food applications of the product. Some of the older thermal stabilizers are destabilizers for photo initiated degradation. We have found that adverse effects of conventional thermal stabilizers are eliminated with the discovery of a class of materials which are so efficient that very minute quantities can be used to provide the desired protection.

In accordance with the present invention in preferred embodiments, ethylene polymers have incorporated therein a very small quantity, at least sufficient to minimize the undesirable effects of thermal processing, of a sulfide of a monohydric dialkyl phenol in which a carbon atom of each of two nuclei of such phenol are joined together by less than three sulfur atoms and each of the alkyl groups contain less than six carbon atoms and at least one alkyl group is a branched chain alkyl group, and which is unsubstituted, except for sulfur, in two of the positions ortho and para to the hydroxy group. Preferred sulfides of dialkyl phenols are monosulfides and disulfides, particularly the former, of alkyl cresols conforming to the limitations given in the preceding sentence. More broadly, the invention encompasses the use of sulfides, especially mono- and disulfides, of alkyl cresols in general. The invention in its broadest aspects employs sulfides of dialkyl phenols in general. Suitable dialkyl phenol sulfides are available commercially. It is preferred that neither alkyl group contain more than 12 carbon atoms. Preferably each alkyl group contains less than 6 carbon atoms and at least one is branched-chained, of which the tertiary alkyl groups are most commonly used, e.g., tert-butyl, tert-amyl.

While, for the sake of convenience, the discussion in the present application is principally directed to sulfides of dialkyl phenols wherein in a single molecule both the dialkyl phenol residues are of the same structure, it will be appreciated that sulfides wherein the two dialkyl phenol residues have different structures are also contemplated although such compounds are not as conveniently made. Sulfides of dialkyl phenols are conveniently obtained by the action of sulfur monochloride ($S_2Cl_2$) or sulfur dichloride ($SCl_2$) on the dialkyl aromatic hydroxy compound. When convenient or desirable other methods of synthesis may be used, and it is to be understood that this invention is not limited to any particular method of synthesis but pertains broadly to the use of the materials described. However, it may be pointed out that since more than one position at which the sulfur may attach to the ring is available, more than a single reaction product may be formed, and it is within the purview of this invention to employ the composite reaction products as well as pure individual compounds. For example, thymol and carvacrol react readily with sulfur dichloride in an organic solvent to produce crystalline solids M.P. (purified) 152–153° C. and 171–172° C., respectively, and minor amounts of other material which remains in the organic solvent. If the solvent is evaporated off without separating the crystalline solid, a composite resinous reaction product remains which is effective in the practice of the invention. Similarly, 4-tertiary butyl meta cresol reacts with sulfur dichloride in ether solution producing a crystalline solid melting at 157–158° C. and an even larger proportion of resinous reaction product. Again, the composite reaction product as well as the pure crystalline compound, can be incorporated in polyethylene in the practice of the invention.

One suitable method of preparation comprises adding a solution of sulfur monochloride or dichloride in carbon tetrachloride or other suitable solvent to a rapidly stirred solution of the dialkyl phenol in the same solvent. The reactions are usually instantaneous and take place with little evolution of heat. The mixture is then cooled to precipitate out the crystalline material and filtered, or where the product is a liquid or where it is desired to isolate the composite reaction product, the solvent is simply removed by evaporation or other suitable means. For example, sulfur dichloride is reacted in this manner with 3,5-xylenol, 3,5-dimethyl-4-chlorophenol, 6-tert-butylmeta-cresol, dodecyl-meta-cresol, and the like.

By way of example but not limitation, the following specific compounds can be named as examples of those which are incorporated in small amount with polyethylene in the practice of the invention: di(1-hydroxy 3-methyl 6-isopropyl phenyl) monosulfide and disulfide, di(1-hydroxy 3-methyl 6-tertiary butyl phenyl) monosulfide and disulfide, di(1-hydroxy 2-tertiary butyl 5-methyl phenyl) monosulfide and disulfide, di(1-hydroxy 2-tertiary amyl 5-methyl phenyl) monosulfide and disulfide, di(1-hydroxy 2-methyl 5-isopropyl phenyl) monosulfide and disulfide, di(1-hydroxy 2-methyl 5-tertiary butyl phenyl) monosulfide and disulfide, di(1-hydroxy 2-methyl 5-tertiary amyl phenyl) monosulfide and disulfide, di(1-hydroxy 3-methyl 4-isopropyl phenyl) monosulfide and disulfide, di(1-hydroxy 3-methyl 4-tertiary amyl phenyl) monosulfide and disulfide, di(1-hydroxy 3-tertiary butyl 4-methyl phenyl) monosulfide and disulfide, di(1-hydroxy 3-isopropyl 4-methyl phenyl) monosulfide and disulfide, di(1-hydroxy 3,6-ditertiary butyl phenyl) monosulfide and disulfide, di(1-hydroxy 2,5-ditertiary butyl phenyl) monosulfide and disulfide, di(1-hydroxy 2-methyl 3-isopropyl phenyl) monosulfide and disulfide, di(1-hydroxy 2-methyl 3-tertiary butyl phenyl) monosulfide and disulfide, di(1-hydroxy 3,5-ditertiary butyl phenyl) monosulfide and disulfide, di(1-hydroxy 3-methyl 5-isopropyl phenyl) monosulfide and disulfide, di(1-hydroxy 3-methyl 5-tertiary butyl phenyl) monosulfide and disulfide, di(1-hydroxy 3-methyl 5-tertiary amyl phenyl) monosulfide and disulfide, di(1-hydroxy 3-methyl 4-secondary butyl phenyl) monosulfide and disulfide, di(1-hydroxy 3-methyl 4-isoamyl phenyl) monosulfide and disulfide. Further examples of suitable compounds which are in general however less efficacious in the practice of the invention are: di(1-hydroxy 3-methyl 6-n-octyl phenyl) monosulfide and disulfide, di(1-hydroxy 3-methyl 6-methyl phenyl) monosulfide and disulfide, di(1-hydroxy 2-methyl 4-tertiary butyl phenyl) monosulfide and disulfide, di(1-hydroxy 2-hexyl 5-hexyl phenyl) monosulfide and disulfide, di(1-hydroxy 3-methyl 4-chloro 5-tertiary amyl phenyl) monosulfide and disulfide. Dialkyl phenol sulfides can be used which contain hydrocarbon groups other than alkyl, e.g., benzyl, phenyl, or non-hydrocarbon groups, e.g., chloro, that do not interfere with the desired effect of the dialkyl phenol sulfides on the ethylene polymers. It will, of course, be understood that some differences will be found in the actions of these dialkyl phenol sulfides and that the various ones are not necessarily the full equivalents of each other in the practice of the invention.

The following structural formula can be used to represent a preferred group of dialkyl phenol sulfides

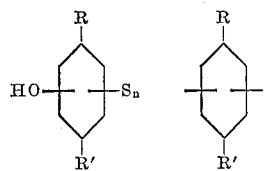

where R and R' are alkyl radicals containing up to 12 carbon atoms and $n$ is an integer less than 3, and preferably where R and R' are alkyl groups of less than 6 carbon atoms at least one alkyl group on each nucleus being a branched-chain alkyl group.

Sulfides of alkyl cresols are especially preferred, particularly those having the following structure:

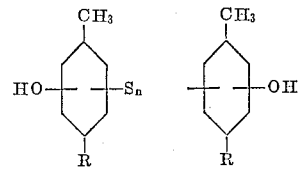

where R is an alkyl radical containing up to 12 carbon atoms and $n$ is an integer less than 3, and more preferably where R is a branched-chain alkyl radical containing less than 6 carbon atoms.

The sulfur bridge is usually para to the hydroxyl group, but the invention is not limited thereto. The amount of dialkyl phenol sulfide to employ in the practice of the invention will of course be dependent to a considerable extent upon the particular dialkyl phenol sulfide employed and upon the treatment to which the polyethylene is to be subjected and the ultimate use of the polyethylene. It will also depend to a somewhat lesser extent upon the particular characteristics of the ethylene polymer, its molecular weight, degree of branching, content of impurities, whether homopolymer or copolymer, and the like. It is a feature of the invention however that ethylene polymers are protected against undesirable effects of thermal processing by incorporation of extremely small amounts of dialkyl phenol sulfides. Thus, in many instances where the thermal processing is to be effected at temperatures below 200° C. and for periods of time not to exceed one hour, 500 parts per million, i.e., 500 parts by weight dialkyl phenol sulfide per million parts by weight ethylene polymer, and even as low as 50 parts per million and less, are effective. As will be seen in the specific examples hereinbelow, even much smaller quantities than these exhibit a protective effect where the processing time is short. Usually no more than 0.1 weight percent is needed. Those skilled in the art, having had the benefit of the present disclosure, can readily determine by simple tests suitable quantities of a particular dialkyl phenol sulfide for a particular polyethylene to give the protection desired. While the invention is especially directed to protecting polyethylene from undesirable effects of thermal processing, the dialkyl phenol sulfides also have value in protecting polyethylene against long term oxidative degradation and where such protection is desired larger quantities of dialkyl phenol sulfide can be used. It is also permissable to incorporate standard antioxidants of various types to give long term protection to polyethylene against sunlight, atmospheric air, ozone, etc.

There are numerous methods that can be used to treat ethylene polymers with sulfides of dialkyl phenols to obtain the benefits of the invention. One of the simplest is to incorporate the sulfide of dialkyl phenol during cold milling of the polyethylene, i.e., during the treatment of polyethylene on conventional rubber mills without the deliberate addition of heat. In order to obtain maximum dispersion of the dialkyl phenol sulfide in the ethylene polymer it is preferred that the dialkyl phenol sulfide be dissolved in suitable solvent, e.g., methanol, ethanol, benzene, toluene, and that the resulting solution be added to the ethylene polymer on the rolls. Ordinarily a volatile solvent is used which will readily evaporate, although if it is permissible or desirable to incorporate a higher molecular weight solvent for the purpose of plasticizing or otherwise affecting the ethylene polymer this may be done. The dialkyl phenol sulfide can also be incorporated in the polyethylene in other mixing devices, for example, Banbury mixers, extruders. The polyethylene can be dissolved in a solvent, for example, hot aromatic hydrocarbons such as benzene or xylene, the dialkyl phenol disulfide in proper amount admixed with the polyethylene solution, and the solution then used for casting films, spinning fibers and similar operations that are well-known to the art, wherein the solvent is evaporated away from the polymer, resulting in the formation of films, fibers, monofilaments and the like. It will be understood that in any of these methods of treating the polyethylene with dialkyl phenol sulfide, during such treating or before or after, conventional fillers, dyes, pigments, other polymers, and the like can be admixed with the polyethylene.

The flow characteristics of ethylene polymers are very important in commercial handling of same. Polyethylene is extruded into sheets, films, fibers and filaments. In these operations the rate of flow of the molten or semi-molten polyethylene greatly affects the productivity of the machine. As indicated hereinabove, processing of polyethylene at elevated temperatures in the presence of oxygen results in severe oxidative cross-linking which promptly reduces the rate of flow. Additionally, the elastic memory of the polymer is greatly increased by such oxidative cross-linking. Elastic memory can be qualitatively described as the property of a polymer to return to its original shape and size after it has undergone change in shape or size in molten or semi-molten conditions. Thus, as polyethylene is extruded from a die, the extruded strand tends to increase in diameter. The higher the elastic memory, the greater the increase in diameter of the strand over the diameter of the die. The same general effect is found when the polyethylene is extruded in sheets, calendered, etc. The practice of the present invention greatly minimizes or completely eliminates these adverse effects on the flow characteristics and elastic memory of polyethylene subjected to thermal treatment in the presence of oxygen. This is accomplished without undesirable side effects on the tensile strength and other properties of the polyethylene. Furthermore, because of the very small concentrations needed to accomplish the stabilization, electrical properties such as power factor and resistivity, which are very sensitive to the presence of any polar materials, are not adversely affected. The electrical properties of polyethylene are also adversely affected by hot milling and similar operations, and also by the action of weather over long periods of time. The dialkyl phenol sulfides maintain the desirable electrical properties of polyethylene subjected to these influences. The dialkyl phenol sulfides are useful in very small quantities with consequent advantages in economy and the elimination of the undesirable effects produced by the addition of comparatively large quantities of stabilizer. They give no noticeable color formation in the polyethylene.

In addition to the advantages already cited, the dialkyl phenol sulfides have a lubricating effect and therefore improve the flow properties of the polymer in proportion to the quantity used. This is obviously advantageous up to the point where other properties begin to be adversely affected in the processing of polyethylene.

The present invention is further illustrated, but not to be unduly limited, by the following examples:

EXAMPLE 1

Tests were made by incorporating into polyethylene varying concentrations of the dialkyl phenol sulfide, or other material to be tested for comparative purposes. Different portions of each of the resulting polyethylene samples were then hot-milled for 15, 30 and 45 minutes, respectively. Melt index extrusion rate, and elastic memory percentage recovery, were measured on the thus-treated materials and also on the same materials not subjected to any hot-milling. It was thus possible to determine the percentage added material required to protect the polyethylene against the undesirable action of hot-milling for the different periods of time stated. A decrease in extrusion rate, and/or an increase in elastic memory, are definite indications that oxidative cross-linking occurred during the hot-milling treatment.

Tests were made as follows.
Melt index value:
 (A) Extrusion rate, grams/10 minutes
 (B) Elastic memory, percent A steel cylindrical chamber is maintained at 190° C. A drilled orifice of 0.063 inch diameter and about 0.6 inch length is screwed into the bottom of the cylinder. A steel ram carrying a weight on the top is used to develop the extrusion pressure on the polymer. The sample to be tested is first mill-rolled for five minutes at the melting point of about 110–120° C. and then diced in order to give a uniform product. After loading the diced particles into the extrusion chamber and placing the ram thereon, five minutes are allowed for the polyer to reach temperature equilibrium with the chamber. The weight is then applied to the ram and extrusion begins. The extruding strand is cut at the orifice and a timer started, and the strand then cut a number of times. The cut strands are weighed and the extrusion rate reported as grams per ten minutes. The elastic memory determination involves the measurement, by a micrometer, of the diameter of the extruded strand at the end which is extruded first. The percentage recovery or memory is calculated as follows:

Percentage recovery =
$$\frac{\text{measured diameter} - \text{orifice diameter}}{\text{orifice diameter}} \times 100$$

Table I gives results obtained with di-(1-hydroxy-3-methyl-6-tert-butylphenyl) monosulfide. Since the sulfur bridge was attached para to the hydroxy group, this compound can also be named 4,4′-thiobis-(6-tert-butyl-m-cresol), or 4,4′-thiobis(3-methyl-6-tert-butylphenol).

Table II gives results obtained with butylated hydroxyanisole, a well-known alkyl phenol antioxidant.

Table III gives results obtained with diphenylamine, which has been patented for use in polyethylene.

Table I

HOT WORKING STABILITY OF POLYETHYLENE CONTAINING VARYING CONCENTRATIONS OF DI-(1 HYDROXY-3-METHYL-6-TERT-BUTYLPHENYL) MONOSULFIDE

| Conc.[2] | Melt Index [1] | | | | Percent Recovery | | | |
|---|---|---|---|---|---|---|---|---|
| | Time of Hot Milling, min. | | | | Time of Hot Milling, min. | | | |
| | 0 | 15 | 30 | 45 | 0 | 15 | 30 | 45 |
| 0 [3] | 2.2 | 1.4 | 0.7 | 0.2 | 67 | 96 | 160 | --- |
| Blank [4] | 2.2 | 1.0 | 1.1 | --- | 73 | 142 | 180 | --- |
| 1 p.p.m | 1.9 | 1.0 | 0.2 | 0.1 | 67 | 120 | 150 | --- |
| 3 p.p.m | 2.2 | 0.8 | 0.1 | 0.3 | 68 | 130 | 130 | 140 |
| 5 p.p.m | 2.2 | 1.4 | 0.2 | 0.3 | 67 | 110 | 160 | 160 |
| 10 p.p.m | 2.3 | 2.2 | 1.6 | 0.8 | 70 | 70 | 120 | 180 |
| 25 p.p.m | 2.4 | 2.3 | 2.1 | 1.9 [5] | 62 | 64 | 64 | 77 [5] |
| 50 p.p.m | 2.5 | 2.4 | 2.6 | 2.5 | 66 | 60 | 61 | 65 |
| 100 p.p.m. (0.01%) | 2.4 | 2.4 | 2.4 | 2.4 | 65 | 67 | 62 | 64 |
| 0.03% | 2.4 | 2.5 | 2.5 | 2.5 | 74 | 66 | 63 | 69 |
| 0.07% | 2.6 | 2.6 | 2.5 | 2.6 | 63 | 64 | 62 | 63 |
| 0.30% | 2.5 | 2.6 | 2.5 | 2.5 | 58 | 59 | 59 | 57 |
| 0.50% | 2.6 | 2.6 | 2.6 | 2.7 | 60 | 57 | 58 | 58 |

[1] Melt index extrusion rate units are gram per 10 minutes.
[2] All samples milled 5 minutes cold to incorporate di-(1-hydroxy-3-methyl-6-t-butylphenyl) monosulfide (added dissolved in 5 ml. methanol).
[3] Milled 5 minutes cold but contained no added material.
[4] Milled 5 minutes cold and contained 5 ml. methanol.
[5] Line through body of table separates acceptable properties (below and left of line) from unacceptable properties (above and right of line).

Table II

HOT WORKING STABILITY OF POLYETHYLENE CONTAINING VARYING CONCENTRATIONS OF BUTYLATED HYDROXY ANISOLE

| Conc.[2] | Melt Index [1] Time of Hot Milling, min. | | | | Percent Recovery Time of Hot Milling, min. | | | |
|---|---|---|---|---|---|---|---|---|
| | 0 | 15 | 30 | 45 | 0 | 15 | 30 | 45 |
| 0.00% [3] | 2.2 | 1.4 | 0.7 | 0.2 | 67 | 96 | 160 | --- |
| 0.03% | 2.4 | 2.3 | 1.9 | 1.3 | 58 | 62 | 86 | 160 |
| 0.07% | 1.9 | 2.0 | 1.6 | 0.7 | 74 | 80 | 130 | 240 |
| 0.30% | 2.4 | 2.3 | 2.2 | 1.6 | 66 | 63 | 69 | 100 |
| 0.50% | 1.9 | 2.2 | 2.3 | 1.1 | 86 | 66 | 68 | 130 |
| 1.0% | 2.0 | 2.3 | 2.3 | 1.8 [4] | 70 | 62 | 65 | 98 [4] |

[1] Melt index extrusion rate units are gram per 10 minutes.
[2] All samples milled 5 minutes cold to incorporate the butylated hydroxy anisole.
[3] Milled 5 minutes cold but contained no added material.
[4] Line through body of table separates acceptable properties (below and left of line) from unacceptable properties (above and right of line).

Table III

HOT WORKING STABILITY OF POLYETHYLENE CONTAINING VARYING CONCENTRATIONS OF DIPHENYLAMINE

| Conc.[2] | Melt Index [1] Time of Hot Milling, min. | | | | Percent Recovery Time of Hot Milling, min. | | | |
|---|---|---|---|---|---|---|---|---|
| | 0 | 15 | 30 | 45 | 0 | 15 | 30 | 45 |
| 0.00% [3] | 2.2 | 1.4 | 0.7 | 0.2 | 67 | 96 | 160 | --- |
| 0.01% | 2.0 | 1.4 | 1.5 | 1.4 | 74 | 92 | 92 | 124 |
| 0.03% | 2.2 | 1.9 | 1.6 | 1.0 | 66 | 75 | 90 | 180 |
| 0.05% | 2.1 | 1.7 | 1.6 | 1.4 | 62 | 79 | 97 | 220 |
| 0.07% | 2.1 | 1.8 | 0.8 | 0.4 | 67 | 78 | 170 | 160 |
| 0.10% | 2.3 | 2.1 | 0.7 | --- | 67 | 76 | 170 | --- |
| 0.30% | 2.3 | 1.9 | 1.4 | 0.5 | 66 | 76 | 120 | 150 |
| 0.50% | 2.4 | 1.9 | 0.3 | --- | 67 | 80 | 170 | --- |
| 0.70% | 2.4 | 2.2 | 1.1 | --- | 66 | 84 | 160 | --- |
| 1.0% | 2.5 | 2.2 | 1.1 | --- | 67 | 76 | 170 | --- |
| 2.0% | 2.8 | 2.2 | 1.6 | 0.4 | 69 | 79 | 100 | 180 |
| 3.0% | 2.8 | 2.3 | 1.7 | 1.4 | 69 | 74 | 110 | 140 |
| 4.0% | 2.9 | 2.4 | 1.9 | 1.7 | 69 | 71 | 83 | 93 |
| 5.0% | 3.2 | 2.4 | 1.9 | 1.4 [4] | 69 | 70 | 83 | 100 [4] |

[1] Melt index extrusion rate units are grams per 10 minutes.
[2] All samples milled 5 minutes cold to incorporate the diphenylamine.
[3] Milled 5 minutes cold but contained no added material.
[4] Line through body of table separates acceptable properties (below and left of line) from unacceptable properties (above and right of line).

It will be seen that just 10 parts per million (0.001%) of the di-(1-hydroxy-3-methyl-6-tert-butylphenyl) monosulfide completely protected the polyethylene against 15 minutes of hot milling, that 25 p.p.m. (0.0025%) protected against 30 minutes hot milling, and that 50 p.p.m. (0.005%) protected against 45 minutes hot milling. In contrast, with the butylated hydroxy anisole 1.0% (10,000 p.p.m.) was not sufficient to protect against 45 minutes hot milling so far as avoiding a decrease in extrusion rate and an increase in elastic memory was concerned. For 15 minutes hot milling, 0.03% (300 p.p.m.) butylated hydroxy anisole was required, while 10 times this quantity, i.e., 0.30%, was needed to protect against 30 minutes hot milling. With diphenylamine, not even 5.0% protected the polyethylene for a 45 minute period of hot milling. Similar to butylated hydroxy anisole, 0.03% diphenylamine protected against increase in elastic memory on 15 minutes hot milling, but 0.10% was required for avoidance of a decrease in extrusion rate for the same short 15 minute hot milling period. It required 4.0% diphenylamine to protect against deterioration of both these properties on hot milling for 30 minutes.

From these comparisons, the remarkable protective action of di-(1-hydroxy-3-methyl-6-tert-butylphenyl) monosulfide on polyethylene is made clear.

EXAMPLE 2

Electrical properties of four different commercial-grade polyethylenes, including that employed in Example 1, were determined, before and after incorporating (by 5 minutes cold milling) 50 parts per million di-(1-hydroxy-3-methyl-6-tert-butylphenyl) monosulfide. The test method was that of Hartshorn and Ward, Jour. Inst. Elect. Engl., November 1936, pp. 597–609. A Marconi Dielectric Test Set was used, giving the electrical dissipation factor at 1 megacycle frequency. The dissipation factor is a measure of the amount of electrical energy converted to heat energy in the polyethylene under the particular conditions of test in which an alternating current is imposed on a sample of the polyethylene. The lower the dissipation factor the better the polyethylene for insulating purposes. The data are in Table IV.

Table IV

| | Dissipation factor at 1 Megacycle | |
|---|---|---|
| | Quantity of di-(1-hydroxy-3-methyl-6-tert-butylphenyl) monosulfide added | |
| | 0 p.p.m. | 50 p.p.m. |
| Polyethylene A | 0.00022 | 0.00021 |
| Polyethylene B | 0.00021 | 0.00018 |
| Polyethylene C | 0.00018 | 0.00019 |
| Polyethylene D | 0.00014 | 0.00015 |

The data show that addition of the polar dialkyl phenol sulfide did not adversely affect the dissipation factor of the polyethylenes.

While the invention has been described herein with particular reference to various preferred embodiments thereof, and examples have been given for suitable materials, proportions and conditions, it will be appreciated that variations from the details given herein can be effected without departing from the invention.

We claim:

1. A normally solid ethylene polymer containing a small amount, up to about 0.5 weight percent but sufficient to minimize adverse effects of thermal processing in the presence of free oxygen, of a sulfide of a dialkyl phenol having a total of not more than 13 carbon atoms in the two alkyl groups of each dialkyl phenol residue.

2. Product of claim 1 wherein said sulfide is a monosulfide.

3. Product of claim 1 wherein said sulfide is a disulfide.

4. Product of claim 1 wherein said polymer is a homopolymer of ethylene.

5. A normally solid ethylene polymer containing as the sole antioxidant a small amount, up to about 0.5 weight percent but sufficient to minimize adverse effects of thermal processing in the presence of free oxygen, of a sulfide of a monohydric dialkyl phenol in which a carbon atom of each of two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho- and para- to the hydroxy group.

6. A normally solid ethylene polymer containing a small amount, up to about 0.5 weight percent but sufficient to minimize adverse effects of thermal processing in the presence of free oxygen, of a sulfide of an alkyl cresol having up to 12 carbon atoms in said alkyl group.

7. Product of claim 6 wherein said sulfide of an alkyl cresol has the structure:

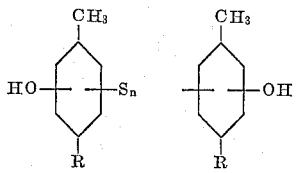

wherein R is an alkyl radical containing up to 12 carbon atoms and $n$ is an integer less than three.

8. Product of claim 7 wherein R is a branched chain alkyl radical containing less than 6 carbon atoms.

9. Polyethylene containing as the sole antioxidant an amount, not in excess of 0.1 weight percent but sufficient to minimize adverse effects of thermal processing in the presence of free oxygen on the flow and elastic memory properties of said polyethylene, of a sulfide of a monohydric dialkyl phenol in which a carbon atom of each of two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho- and para- to the hydroxy group.

10. Polyethylene containing as the sole antioxidant a small amount, up to about 0.5 weight percent but sufficient to minimize adverse effects of thermal processing in the presence of free oxygen, of di(1 - hydroxy - 3-methyl - 6 - tert - butyl phenyl) monosulfide.

11. Polyethylene containing as the sole antioxidant a small amount, up to about 0.5 weight percent but sufficient to minimize adverse effects of thermal processing in the presence of free oxygen, of a sulfide of an alkyl cresol having the structure:

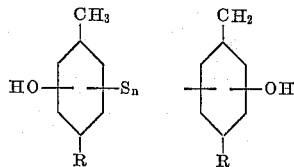

wherein R is a branched chain alkyl radical containing less than six carbon atoms and $n$ is an integer less than three.

12. Polyethylene containing as the sole antioxidant a small amount, up to about 0.5 weight percent but sufficient to minimize adverse effects of thermal processing in the presence of free oxygen, of di(1 - hydroxy - 3-methyl - 6 - tert - amyl phenyl) monosulfide.

13. Polyethylene containing as the sole antioxidant a small amount, up to about 0.5 weight percent but sufficient to minimize adverse effects of thermal processing in the presence of free oxygen, of di(1 - hydroxy - 2-methyl-5-tert-butyl phenyl) monosulfide.

14. A composition of matter consisting essentially of polyethylene and as the sole antioxidant a small amount, up to about 0.5 weight percent but sufficient to minimize adverse effects of thermal processing in the presence of free oxygen, of a sulfide of a dialkyl phenol having a total of not more than 13 carbon atoms in the two alkyl groups of each dialkyl phenol residue.

15. A method of treating polyethylene which comprises subjecting same to mechanical working at elevated temperatures in the presence of free oxygen, and treating said polyethylene prior to completion of said working with, as the sole antioxidant, a small but protective amount up to about 0.5 weight percent of a sulfide of a monohydric dialkyl phenol in which a carbon atom of each of two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho- and para- to the hydroxy group.

16. A normally solid ethylene polymer containing as the sole antioxidant a small amount, up to about 0.5 weight percent but sufficient to minimize adverse effects of thermal processing in the presence of free oxygen, of 4,4' - thiobis(3 - methyl - 6 - tert - butylphenol).

17. Polyethylene containing as the sole antioxidant a small amount, up to about 0.5 weight percent but sufficient to minimize adverse effects of thermal processing in the presence of free oxygen, of 4,4'-thiobis(3-methyl-6-tert-butylphenol).

18. A normally solid ethylene polymer containing as the sole antioxidant a small amount, up to about 0.5 weight percent but sufficient to minimize adverse effects of thermal processing in the presence of free oxygen, of a sulfide of a dialkyl phenol having a total of not more than 13 carbon atoms in the two alkyl groups of each dialkyl phenol residue and the sulfur bridge being para to the hydroxyl groups.

19. Stabilized polyethylene composition comprising a normally solid polymer of ethylene and between 0.05% to 0.5% by weight of the polymer of 4,4'-thiobis-(6-tert-butyl-meta cresol).

20. Stabilized polyethylene composition comprising a normally solid polymer of ethylene and a stabilizing amount below 0.5 percent of 4,4'-thiobis(6-tert-butyl-meta-cresol).

References Cited by the Examiner
UNITED STATES PATENTS

| | | | |
|---|---|---|---|
| 2,434,662 | 1/48 | Latham et al. | 260—45.95 |
| 2,628,212 | 2/53 | Young | 260—45.95 |
| 2,670,382 | 2/54 | Downey | 260—45.95 |
| 2,675,366 | 8/54 | Pullman | 260—45.95 |
| 2,716,096 | 8/55 | Young et al. | 260—45.95 |
| 2,364,338 | 12/64 | Beaver | 260—45.95 |

LEON J. BERCOVITZ, *Primary Examiner.*

UNITED STATES PATENT OFFICE
CERTIFICATE OF CORRECTION

Patent No. 3,170,893                                 February 23, 1965

Samuel Steingiser et al.

It is hereby certified that error appears in the above numbered patent requiring correction and that the said Letters Patent should read as corrected below.

Column 1, line 69, for "electrcal" read -- electrical --; column 3, lines 63 to 69, the right-hand benzene ring should appear as shown below instead of as in the patent:

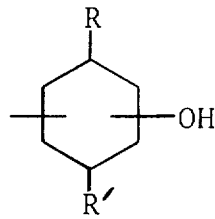

column 4, line 49, for "permissable" read -- permissible --; column 6, line 14, for "polyer" read -- polymer --; column 8, line 12, for "remarkazle" read -- remarkable --; column 9, lines 45 to 51, the right-hand benzene ring should appear as shown below instead of as in the patent:

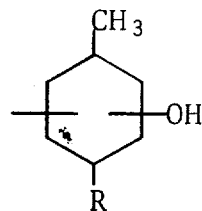

column 10, line 57, for "8/54" read -- 4/54 --; line 59, strike out "2,364,338  12/64  Beaver ---------- 260-45.95", and insert -- 2,364,338  12/44  Beaver ---------- 260-45.95 --, in line 53, same column 10.

Signed and sealed this 13th day of July 1965.

(SEAL)
Attest:

ERNEST W. SWIDER                              EDWARD J. BRENNER
Attesting Officer                            Commissioner of Patents